United States Patent [19]

Chi

[11] 4,383,008

[45] May 10, 1983

[54] FUEL CELL ASSEMBLY WITH ELECTROLYTE TRANSPORT

[75] Inventor: Chang V. Chi, Brookfield, Conn.

[73] Assignee: Energy Research Corporation, Danbury, Conn.

[21] Appl. No.: 327,970

[22] Filed: Dec. 7, 1981

[51] Int. Cl.³ .............................................. H01M 2/14
[52] U.S. Cl. .................................... 429/38; 429/72; 429/81
[58] Field of Search ..................... 429/38, 39, 72, 81

[56] References Cited

U.S. PATENT DOCUMENTS

| 3,615,838 | 10/1971 | Erickson | 429/38 X |
| 3,871,922 | 3/1975 | Böhm | 429/40 |
| 4,210,512 | 7/1980 | Lawrence et al. | 429/38 X |

*Primary Examiner*—Charles F. LeFevour

[57] ABSTRACT

A fuel cell assembly wherein electrolyte for filling the fuel cell matrix is carried via a transport system comprising a first passage means for conveying electrolyte through a first plate and communicating with a groove in a second plate at a first point, the first and second plates together sandwiching the matrix, and second passage means acting to carry electrolyte exclusively through the second plate and communicating with the groove at a second point exclusive of the first point.

22 Claims, 2 Drawing Figures

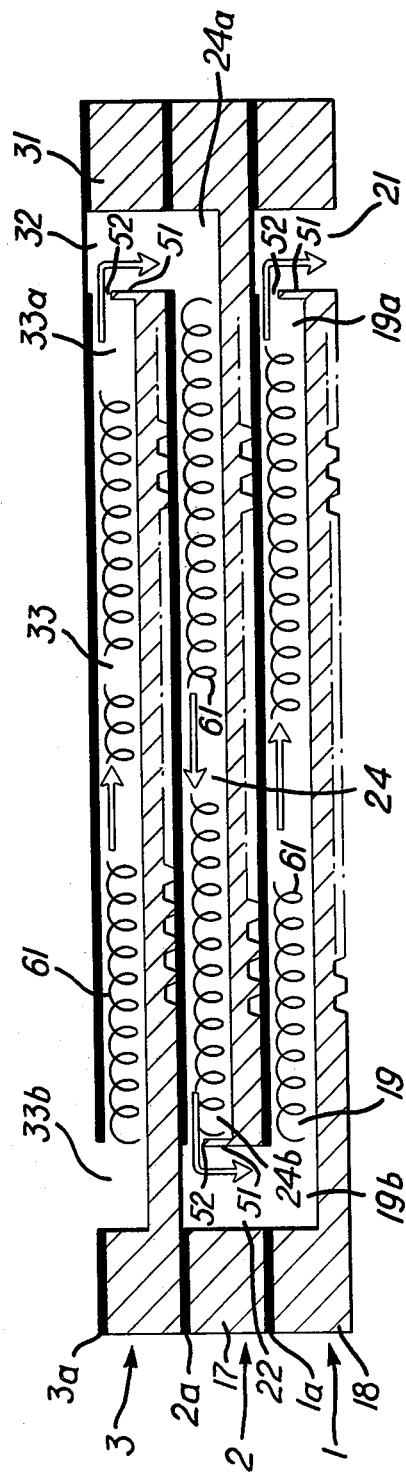

FUEL CELL ASSEMBLY WITH ELECTROLYTE TRANSPORT

BACKGROUND OF THE INVENTION

This invention pertains to fuel cells containing electrolyte matrices and, in particular, to fuel cells containing such matrices and arranged in stack form.

In the design of fuel cells for use in a fuel cell stack, it is necessary to provide means to ensure that the matrix of each of the fuel cells receives an initial amount of electrolyte sufficient to provide electrochemical reaction. It is further necessary to provide means to ensure that the electrolyte lost during the operation of each cell is replenished. Failure to provide sufficient initial electrolyte and/or electrolyte replenishment reduces cell performance and can lead to cross over of reactant gases and attendant cell failure and, therefore, must be avoided.

Loss of electrolyte during fuel cell operation can occur in a number of ways. Thus, electrolyte is lost by being carried as a vapor from the cell by the reactant process gases. Also, the electrolyte volume is changed by changes in cell temperature and excess electrolyte at any given temperature is caused to leave the cell. This leaves insufficient electrolyte at later cell temperatures requiring increased electrolyte. Electrolyte loss also occurs due to other cell components which absorb electrolyte as they age.

Since, as above-noted, insufficient cell electrolyte reduces cell performance and can lead to cell failure, two basic approaches have been devised for ensuring proper filling and replenishing of electrolyte to the cell matrices. One approach looks to adding electrolyte to the matrices as wanted and another to storing all the needed electrolyte in the cell itself.

In one particular design embodying the second approach, an element of each cell (e.g., the anode electrode) is provided with a storage area for the electrolyte needed for replenishment. This typically requires that the cell component used for storage be thicker than would normally be the case. Since thicker cell components are undesirable, this design lends itself only to storage of a limited amount of electrolyte. Thus, replenishment can only be provided over a short term and not for the life of the cell.

Another design, this time embodying the first approach, makes use of a slot in the separator plate supporting the electrolyte matrix. This slot runs along an edge of the matrix and at opposite ends communicates with bores running through the plate. With the cells arranged in stack form the bores in each separator of each cell are placed in alignment. With this technique, however, it is possible for electrolyte to bypass a particular cell and, therefore, there is never assurance that electrolyte has been uniformly applied to each cell.

It is, therefore, an object of the present invention to provide a fuel cell assembly including electrolyte transport means adapted to ensure electrolyte communication with the cell matrix.

It is a further object of the present invention to provide a fuel cell assembly of the above-type which can be arranged in stack form with similarly adapted other fuel cells.

SUMMARY OF THE INVENTION

In accordance with the principles of the present invention the above and other objectives are realized in a fuel cell assembly comprising an electrolyte matrix, first and second electrodes sandwiching the matrix and first and second plates abutting the first and second electrodes and defining first and second chambers for carrying first and second process gases. Transport means is provided for carrying electrolyte through the first plate into communication with the matrix and through the second plate. The latter means includes an elongated groove disposed in the second plate and in communication with the matrix. A first passage means carries electrolyte through the first plate and communicates with the groove at a first point, while a second passage means acts to exclusively carry electrolyte through the second plate and communicates with the groove at a second point exclusive of the first point.

With the above arrangement, the electrolyte fed into the first or second passage means is constrained to pass through the length of the groove situated between the first and second points so that there is always assurance that the electrolyte will pass through the cell for entry into the matrix. By stacking a number of analogously configured and suitably arranged cells, a stack can be realized for which there will always be passage of electrolyte through each cell and in communication with each cell matrix.

In a further aspect of the invention, means is provided for inhibiting the electrolyte matrix from entering the elongated groove and further means is provided for creating an electrolyte reservoir in the groove.

BRIEF DESCRIPTION OF THE DRAWINGS

The above and other features and aspects of the present invention will become more apparent upon reading the following detailed description in conjunction with the accompanying drawings, in which:

FIG. 2 illustrates a cross section of the fuel cell assembly of FIG. 1, and a number of similar assemblies stacked thereon.

DETAILED DESCRIPTION

Figure 1:
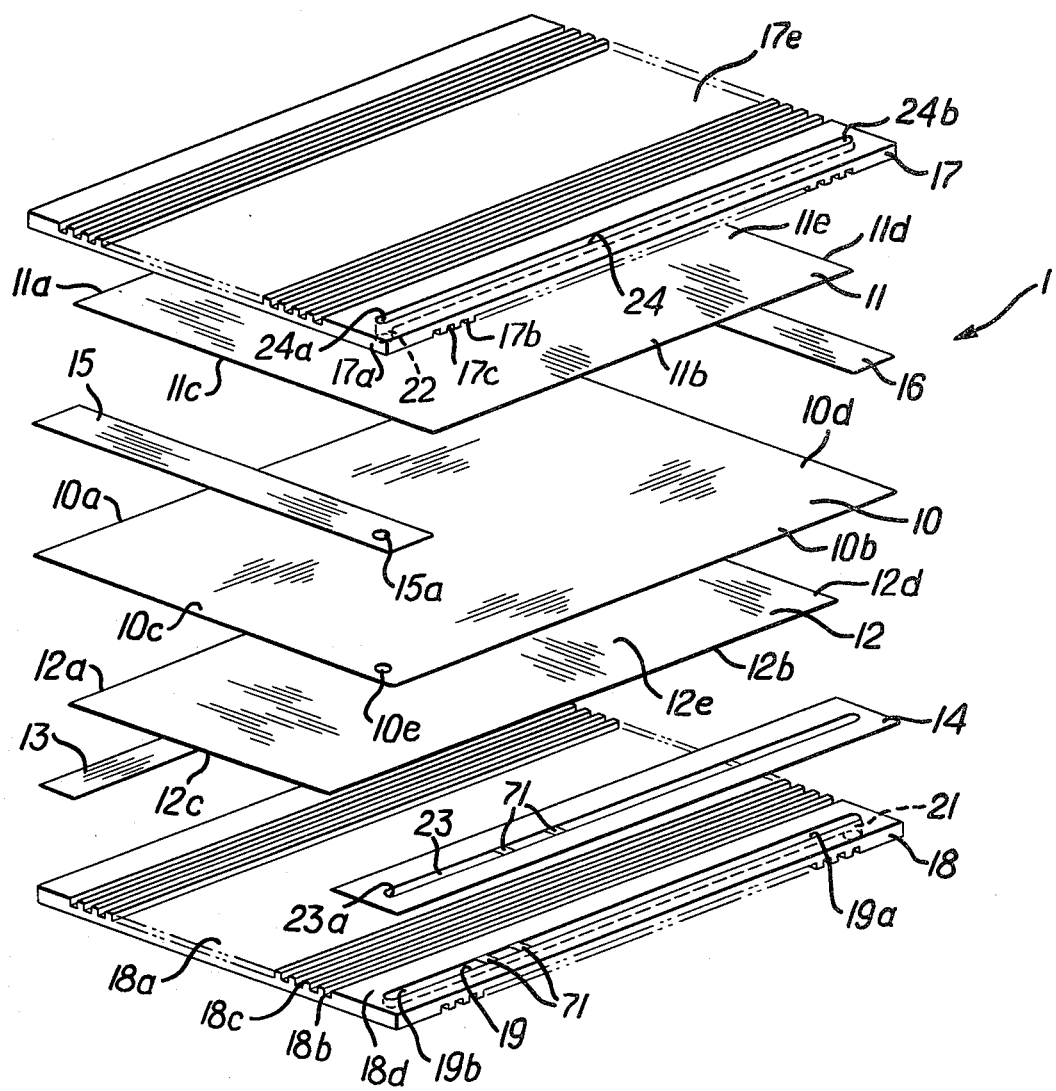
FIG. 1 shows an exploded view of a fuel cell assembly in accordance with the principles of the present invention.

In FIG. 1, the fuel cell assembly 1 comprises an electrolyte matrix 10 which is sandwiched between first and second electrodes 11 and 12 which are of smaller lateral and longitudinal dimension than the matrix. Plates or shims 13 and 14 border the lateral edges 12a and 12b of the electrode 12 and sandwich the matrix sections 10a, 10b extending therebeyond. Similarly, additional plates or shims 15 and 16 border the longitudinal edges 11c, and 11d of the electrode 11 and sandwich extending matrix sections 10c and 10d.

Bipolar plates 17 and 18, in turn, abut the electrodes 11 and 12, respectively, and the shims 13–16. These plates define with the electrodes passages or channels for carrying process gases. In particular, the lower surface 17a of plate 17 includes a plurality of grooves 17b which define with the interior region 11e of the electrode 11 a first set of process gas channels 17c. Similarly, the interior region 12e of the electrode 12 cooperates with grooves 18b in the upper surface 18a of the plate 18 to define a second set of process gas channels 18c, these channels being crisscross to the channels 17c.

In order for the process gases in the channels 17c and 18c to undergo appropriate electrochemical reaction and thereby enable generation of electrical energy by the fuel cell 1, the matrix 10 must contain an appropriate amount of electrolyte. This, in turn, requires that the cell 1 be adapted such that the matrix 10 can be initially filled with a desired amount of electrolyte and such that the matrix 10 can be provided with additional electrolyte during cell operation to replenish lost electrolyte.

In accordance with the principles of the present invention, electrolyte transport means is provided in the cell 1 so that there is assurance that the matrix 10 will receive its initial amount and subsequent or replenishing amounts of electrolyte. More particularly, the plate 18 is provided with an electrolyte channel 19 along a lateral edge 18d which is overlapped by the matrix section 10b. The channel 19 extends into the upper surface 18a of the plate 18 to a preselected depth and communicates at one end 19a with a bore 21 extending through the plate 18. The other end 19b of the channel is closed with respect to direct passage through plate 18 and communicates with a through bore 22 in the plate 17 via apertures 15a and 10e in the shim 15 and matrix 10, respectively, and via an end 23a of a slot 23, the latter being provided in the shim 14 to allow communication between the matrix section 10b and the electrolyte channel 19.

With this configuration for the electrolyte transport means, electrolyte supplied to the cell 1 through bore 22 is conveyed thereby via apertures 15a and 10e and slot end 23a to the end 19b of the channel 19. Since this channel end is closed to direct passage through plate 18, the electrolyte is forced to pass along the channel length, whereby the electrolyte communicates via the slot 14 with the matrix section 10b causing the matrix to be filled with electrolyte. Excess electrolyte then leaves the channel 19 at channel end 19a via through bore 21.

As can be appreciated, therefore, in order for electrolyte to exit the cell 1 from bore 21, it must have passed through channel 19 and therefore must have communicated with the electrolyte matrix 10. As a result, one is assured that the electrolyte matrix 10 is filled, once electrolyte passes from bore 21.

As shown, the plate 17 also includes a channel 24 in its upper surface 17e. The channel 24 communicates at one end 24a with the through passage 22, while its other end 24b is closed with respect to passage through the plate 17. Channel 24 can thus serve as an electrolyte channel similar to channel 19 for the matrix of a fuel cell which precedes the cell 1. In particular, by stacking a number of cells similar to the fuel cell 1, above and below the fuel cell 1 a fuel cell stack is realized for which electrolyte communication with the electrolyte matrix of each cell of the stack is made certain.

FIG. 2 illustrates a cross section through the lateral end of such a stack of fuel cells. As shown, the cell 1 is preceded by two cells 2 and 3. More particularly, the bipolar plate 17 of the cell 1 supports a matrix, electrode and shim arrangement of the cell 2 similar to that of the cell 1 of FIG. 1 and designated collectively as 2a. The matrix of this arrangement communicates with the channel 24 of the plate 17.

The closed end 24a of the channel 17 receives electrolyte from a through bore 32 in a bipolar plate 31 of the cell 2. This bore is at one end 33a of an electrolyte channel 33 whose other end 33b communicates with a through bore (not shown) of the bipolar plate (not shown) of the preceding cell 3. The channel 33 provides electrolyte to the matrix of the cell 3 included in the matrix, electrode and shim arrangement collectively designated as 3a.

The matrix, electrode and shim arrangement 1a of the cell one, as above-described, allows electrolyte to pass from the through bore 22 into the channel 19 in the plate 18 at the channel end 19b. Electrolyte passes out of the channel 19, in turn, at end 19a via through bore 21.

In accordance with a further aspect of the invention, the electrolyte channels 33, 24 and 19 of the bipolar plates 31, 17 and 18 are each provided with end walls 51 at their ends adjacent the plate through bores (i.e., at ends 33a, 24b and 19a, respectively). Each of these walls extends upwards of its respective channel to a height less than the channel depth and, therefore, enables the channel to act as reservoir for storing excess electrolyte which can be used to replenish electrolyte lost by the matrices during stack operation. The space 52 between each end wall 51 and the corresponding matrix, electrode and shim arrangement, in turn, serves to permit passage of electrolyte from each channel to the corresponding through bore for delivery to the channel of the next bipolar plate.

The FIG. 2 embodiment also shows adaptation of the cells of the invention in accordance with yet a further aspect of the invention. In particular, each cell is provided with support means for inhibiting entry of the cell matrix into the corresponding electrolyte channel. Thus, as shown, a matrix-supporting teflon spiral 61 is situated in each of the channels 19, 24 and 33. Each matrix is thereby prevented from entering its respective electrolyte channel, which would otherwise occur due to swelling of the matrix. Thus, blockage of the channels is avoided as in shearing of the matrices along the channel edges. Additionally, the support does not itself significantly obstruct electrolyte flow. Other supports capable of similar operation might also be used. For example, lands 71 might be situated along the top of each channel or along the length of each slot 23, as shown in FIG. 1.

In use of the stack of FIG. 2, electrolyte is supplied to the end 33b of the channel 33 from an electrolyte supply. The electrolyte proceeds down the channel 33 and fills the matrix of the cell 3. The electrolyte then fills the reservoir formed in the channel by the wall 51 and, thereafter, passes through the space 52 into the through bore 32 and from there into the end 24a of the channel 24. The electrolyte passes down the channel filling the matrix of the fuel cell 2 and filling the channel. Electrolyte then passes through the space 51 into the through bore 22 and into the end 19b of the channel 19. Again the electrolyte passes along the channel length filling the matrix and channel. Excess electrolyte then passes through space 52 and out of the stack via through bore 21.

Passage of electrolyte though through bore 21 indicates filling of the stack with complete assurance that the matrix of each cell has been filled. To replenish electrolyte, a similar procedure is carried out, again with the appearance of electrolyte at bore 21 indicating replenishment.

In all cases, it is understood that the abovedescribed arrangements are merely illustrative of the many possible specific embodiments which represent applications of the present invention. Numerous and varied other arrangements can readily be devised in accordance with the principles of the present invention without departing from the spirit and scope of the invention. Thus, for example, the shims 13–16 of the cell of FIG. 1 could be replaced by making either plate 17 or 18 or both thicker in their respective regions abutting the shims to compensate for removal of the latter.

What I claim is:

1. A fuel cell assembly comprising:
   first and second electrodes;
   an electrolyte matrix situated between said electrodes;
   first and second plates situated adjacent said first and second electrodes, and defining therewith first and second chambers for carrying first and second process gases respectively;
   and means for carrying electrolyte through said first plate into communication with said matrix and through said second plate comprising:
   an elongated groove in said second plate, said groove being in communication with said matrix;
   first passage means for carrying electrolyte through said first plate and for communicating with said groove at a first point;
   and second passage means for communicating with said groove at a point exclusive of said first point and for carrying electrolyte exclusively through said second plate.

2. An assembly in accordance with claim 1 further comprising:
   means cooperating with said groove to create a reservoir for said electrolyte.

3. An assembly in accordance with claim 2 wherein:
   said reservoir means includes a wall situated in said groove between said first point and said second point, said wall being of less height than the depth of said groove, whereby the extent of said groove between said first point and said wall forms said reservoir for said electrolyte.

4. An assembly in accordance with claim 3 wherein:
   said wall is immediately adjacent said second point.

5. An assembly in accordance with claim 1 wherein:
   said matrix overlaps said groove.

6. An assembly in accordance with claim 1 or 5 further comprising:
   means for inhibiting said matrix from entering said groove.

7. An assembly in accordance with claim 6 wherein:
   said inhibiting means supports said matrix.

8. An assembly in accordance with claim 7 wherein:
   said inhibiting means comprises a resilient spiral shaped member disposed in said groove.

9. An assembly in accordance with claim 8 wherein:
   said resilient member comprises polytetrafluroethylene.

10. An assembly in accordance with claim 6 wherein:
    said inhibiting means comprises lands distributed across the top of said groove.

11. An assembly in accordance with claim 1 wherein:
    said groove extends along a second side of said second plate;
    a side of said matrix is aligned with said second side of said second plate;
    said first plate has a first side aligned with said side of said matrix;
    said first passage means includes a first bore extending through said first plate on said first side;
    said second passage means includes a second bore extending through said second plate on said second side and opening into said groove at said second point.

12. An assembly in accordance with claim 11 wherein:
    the side of said second electrode on said side of said matrix terminates prior to said groove;
    said second side of said second plate and a side of said first electrode sandwich said side of said matrix;
    and said first passage means includes an aperture in said matrix aligned with an end of said first bore.

13. An assembly in accordance with claim 11 wherein:
    the side of said second electrode on said side of said matrix terminates prior to said groove;
    said assembly further includes a third plate situated adjacent said terminating end of said second electrode and extending beyond said groove in abutting relationship to said side of said matrix;
    said first passage means includes an aperture in said matrix;
    and said second passage means includes a slot in said third plate aligned with said groove.

14. An assembly in accordance with claim 13 further comprising:
    a number of lands distributed along the length of the slot in said third plate, said lands inhibiting said matrix from entering said groove.

15. An assembly in accordance with claim 11, 12 or 13 wherein:
    said groove extends along the length of said side of said matrix.

16. An assembly in accordance with claim 15 wherein:
    said first and second plates, said matrix and said first and second electrodes are of rectangular configuration.

17. An assembly in accordance with claim 1 wherein:
    said first and second points are at opposite ends of said groove.

18. An assembly in accordance with claim 1 further comprising:
    third and fourth electrodes;
    a further electrolyte matrix situated between said third and fourth electrodes;
    third and fourth plates situated adjacent said third and fourth electrodes and defining therewith third and fourth chambers for carrying first and second process gas, respectively;
    and further means for carrying electrolyte from said second passage means through said third plate into communication with said further matrix and through said fourth plate comprising:
    a further elongated groove in said fourth plate, said groove being in communication with said further matrix;
    third passages means for communicating with said second passage means for carrying electrolyte through said third plate and for communicating with said further groove at a third point;
    and fourth passage means for communicating with said further groove at a fourth point exclusive of said third point and for carrying electrolyte exclusively through said fourth plate.

19. An assembly in accordance with claim 18 wherein:
    said second and third plates are formed as a common plate.

20. An assembly in accordance with claim 1 or 18 wherein:
    said first plate is above said second plate.

21. An assembly in accordance with claim 20 wherein:

electrolyte enters said cell through said first passage means and exits said cell through said second passage means.

22. A method of using the cell of claim 1 comprising: situating said cell to dispose said first plate above said second plate; and supplying electrolyte to said first passage means.

* * * * *